US008565687B2

(12) United States Patent
Dickey

(10) Patent No.: US 8,565,687 B2
(45) Date of Patent: Oct. 22, 2013

(54) SIGNAL DETECTION ASSISTED BY USE OF MOVING ANTENNAE

(75) Inventor: Sergey Dickey, Lovettsville, VA (US)

(73) Assignee: Wavenetix Corp., Lovettsville, VA (US)

( * ) Notice: Subject to any disclaimer, the term of this patent is extended or adjusted under 35 U.S.C. 154(b) by 210 days.

(21) Appl. No.: 13/281,704

(22) Filed: Oct. 26, 2011

(65) Prior Publication Data

US 2012/0108192 A1 May 3, 2012

Related U.S. Application Data

(60) Provisional application No. 61/407,985, filed on Oct. 29, 2010.

(51) Int. Cl.
*H04B 1/06* (2006.01)
*G01S 5/04* (2006.01)

(52) U.S. Cl.
USPC .......................................... 455/67.11; 342/449

(58) Field of Classification Search
USPC ............... 455/67.11, 67.13, 67.14, 63.1, 441, 455/513, 517, 562.1; 342/449
See application file for complete search history.

(56) References Cited

U.S. PATENT DOCUMENTS 6,693,587 B1 * 2/2004 Kuether et al. ............... 342/359
6,731,240 B2 * 5/2004 Dybdal et al. ................ 342/359

* cited by examiner

*Primary Examiner* — Nay A Maung
*Assistant Examiner* — Maryam Soltanzadeh
(74) *Attorney, Agent, or Firm* — The Marbury Law Group, PLLC

(57) ABSTRACT

Signal detection assisted by use of moving antennae. A signal of interest may be detected in signal samples measured by a single antenna installed on a moving platform. A first sample is collected at time $T_1$ and a second signal sample at time $T_2$ by the single antenna. The first signal sample is treated as having been received by a first antenna mounted on the moving platform and the second signal sample is treated as having been received by a second antenna mounted on the moving platform. The samples are processed by a receiver of the first and second signal samples to detect the signal of interest.

12 Claims, 9 Drawing Sheets

SIGNAL DETECTION ASSISTED BY USE OF MOVING ANTENNAE

CROSS REFERENCE TO RELATED APPLICATIONS

This application claims priority under 35 U.S.C. §119(e) from provisional application No. 61/407,985 filed Oct. 29, 2010. The 61/407,985 provisional application is incorporated by reference herein, in its entirety, for all purposes, and at least provides support for disclosures and claims hereof relating to the use of a single antenna mounted on a moving platform to detect a signal of interest.

BACKGROUND

In cellular network optimization, one common task is the so-called propagation model optimization, which customarily requires at least 30 dB of dynamic range of detection. Historically, this and higher levels of dynamic range were achieved by using frequency separation between signals, such as in frequency division multiplex (FDM) systems or by using special transmitters in "key-up" measurement campaigns. Later, the dynamic range of the measurements in CDMA-based networks was increased when the signals themselves were designed with the goal of increased detection ability. In particular, extremely long pseudo random codes were used in CDMA and WCDMA-based protocols, which enabled detection of signals buried under more than 30 dB of interference and noise. However, the exigencies of better protocol efficiencies made the design of newer, OFDMA-based signals less effective for detection of weak signals in the presence of stronger interference. For example, the detection of WiMAX signals using the so-called preamble, which carries information about the source sector, becomes problematic at close to −13 dB level.

With the advent of MIMO technologies in the fourth generation of cellular networks, the radio receivers for signal detection and measurements ("scanners") will be built as multichannel coherent parallel receivers in order to provide measurements of channel characteristics pertinent to MIMO capacity of radio channels. It is possible to use this multichannel architecture of the receivers, together with a multi-antenna array, to also improve the ability to discriminate between signals and improve the dynamic range by using such known techniques as beam-forming and interference cancellation.

Despite recent advances of the computer technology, building a practical multichannel detection and measurement receiver for modern 4-G technologies like WiMAX and LTE presents a definite challenge. For example, for the widest standardized LTE signal bandwidth of 20 MHz one would need to digitize and store two signal samples at the rate of more than 20 Msps (samples per second) or more realistically, at 30 Msps. At 16 bits per sample (2 bytes), that amounts to 30×2=60 Mbytes/sec per antenna. It is desirable to have 8 antennae in an array, which yields 8×60=480 Mbytes/sec for the system. Although this is feasible with modern serial busses, the storage requirements are pushing the envelope since the recording has to continue for hours in a usual drive-testing scenario. In one hour, the system will fill 480×3600=1.728 TB of memory. After eight hours of driving it will come to 13.8 TB, which clearly exceeds the practical limit of current storage technology. It is desirable to keep this requirement under 2 TB, which is the size of widely available hard disks today.

In addition to the limitations of the storage technology, a massively multichannel radio receiver is prohibitively expensive and power-hungry. There is a need to decrease the number of RF channels in systems for signal detection and measurement without appreciably sacrificing their characteristics.

SUMMARY

The present invention achieves the goal of improving the dynamic range of signal detection while using a single antenna or reduced number of antennae, in the case of a moving receiving platform. Embodiment methods include using at least one antenna on a moving platform to collect a first and a second frame and using these frames and certain variables in a function. The values of the variables in the function may be determined recursively such that the variables minimize a correlation between the result of the function and a reference data pattern. The determined values of the variables may be used to cancel a stronger signal associated with the reference data pattern and improve reception of a weaker signal.

DETAILED DESCRIPTION

Embodiment system and methods involve one or more moving antennae that may be used to measure and differentiate signals. An antenna may collect two or more signal frames in short succession. These frames may be combined according to particular embodiment functions. Values within the embodiment functions may be adjusted recursively to find a result with the lowest correlation to a particular reference data pattern, such as a signal preamble. The signal associated with that particular reference data pattern may then be cancelled so that a weaker otherwise undetectable signal may be measured.

Figure 1:
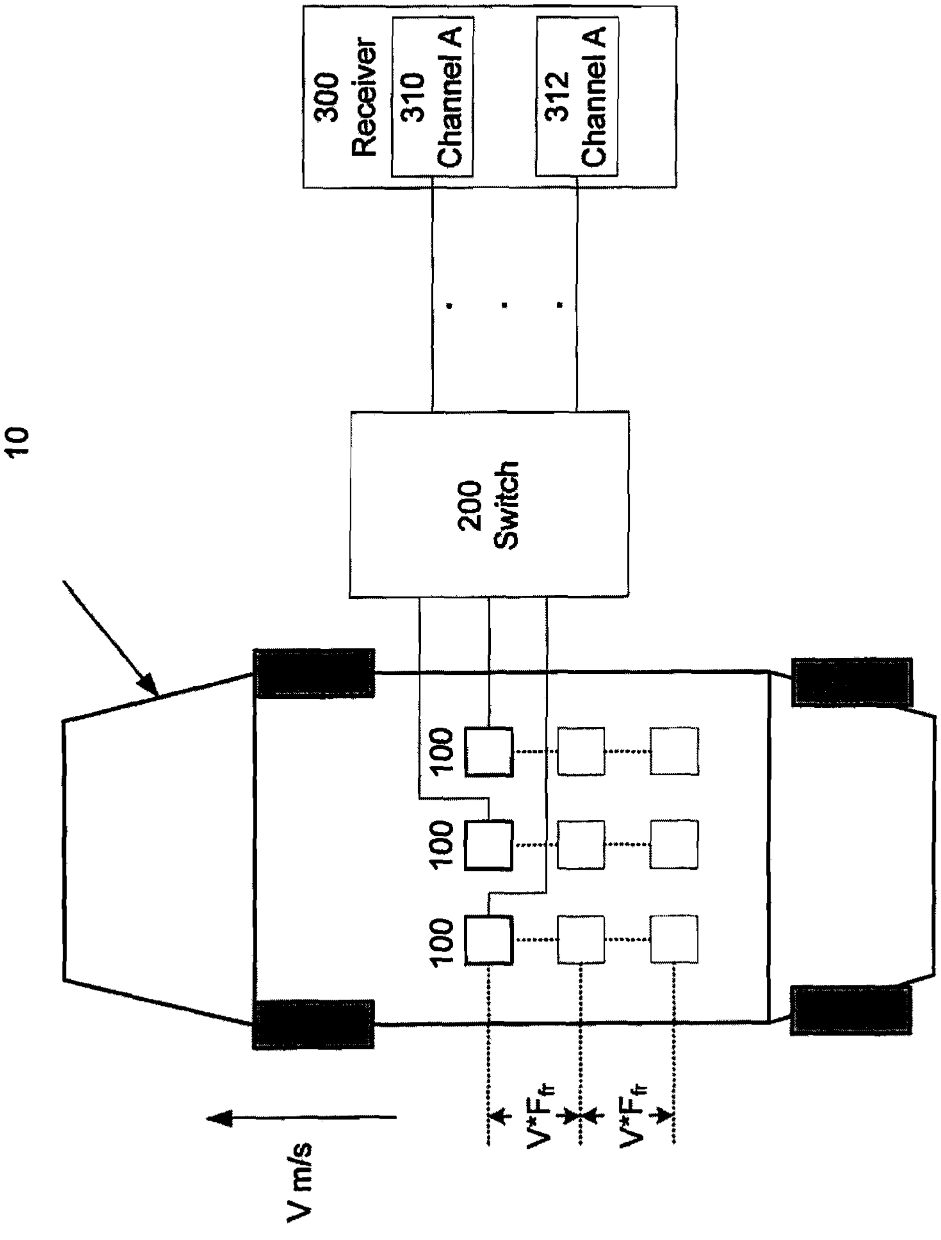
FIG. 1 is a block diagram illustrating a system according to an embodiment.

FIG. 1 illustrates a preferred embodiment. One or more antennae 100 may be mounted on a moving vehicle 10. The preferred arrangement of the antennae is in a straight line that is orthogonal to the direction of the vehicle, but other arrangements are conceivable and permissible as well. Each antenna may be connected directly or via a switch 200 to a receiver 300 input. In this way, the number of RF channels 310 in the receiver may be in the range from 1 (the case when only a single antenna is used or there is a serial operation provided with multiple antennae via a switch arrangement) through N where N is the total number of antennae in a true parallel operation with no switching.

Receiver 300 may include one or more processors (not illustrated) that execute software instructions to perform operations on signals and to implement the various algorithms described herein. Receiver 300 may include or be connected to a computing device as described below to perform various operations on signals and to implement the various algorithms described herein.

The vehicle 10 may move at a speed of V m/s in the presence of radio signals propagating from multiple base stations in the area covered by a drive-test. Each of the signals contains fixed patterns called preambles, pilots, or similar names that are repeated at the fixed repetition rate of $F_{fr}$ 1/sec. In this way, each of the antennae receives the same fixed signal multiple times at the points separated by a distance of $V/F_{fr}$ for each adjacent repetition of the pattern. Previous positions of the antennae are shown in dashed lines in FIG. 1. In essence, if one assumes that the channel characteristics stay constant during the interval $T_{fr}=1/F_{fr}$, the described operation is not different from the case of the reception by two antennae separated by $V/F_{fr}$ in parallel. Under this condition, all of the usual capabilities of linear antenna arrays of pattern shaping and forming nulls in the directions of unwanted spatial waveform components are available with this "virtual array."

Even without the above assumption of the channel state remaining constant between measurements of the repeating frames, it is still possible to cancel signal components by combining various frames, scaled by properly chosen complex weights. In this case though, the information about angles of arrival of various waveforms may not be available.

Figure 2:
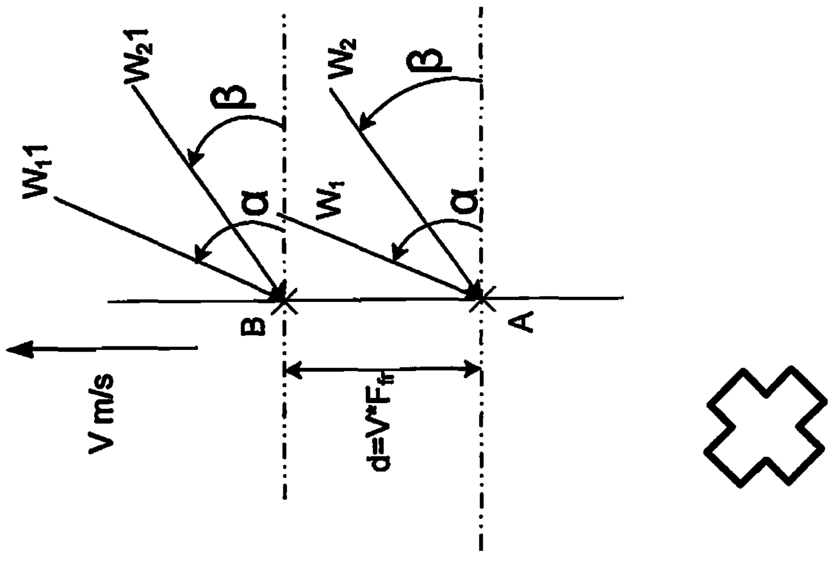
FIG. 2 is a diagram of two waves arriving at different angles at two positions of an antenna according to an embodiment.

For example, consider the case of the two incident waves $W_1$ and $W_2$ coming at the corresponding angles of arrival $\alpha$ and $\beta$, as shown in FIG. 2. These two waves may be two different signals and may be resolved by the receiver based on the different signal patterns of the two signals. The two waves may be two multipath components of the same signal. If the two waves share the same pattern, they may be resolved based on the signal delay between the multipath components exceeding the minimal resolution threshold of the receiver.

Two positions of the single antenna are shown in FIG. 2, designated points A and B. Point B is the position delayed in time and distance relative to point A by one repetition period (frame period) of the signal, where period $T_{fr}=1/F_{fr}$ where $F_{fr}$ is frame frequency. Delay $T_{fr}$ corresponds to the distance d between points A and B. The distance d between points A and B'equals $V*T_{fr}$ where V is the speed of the vehicle.

Assuming that both the delay $T_{fr}$ and distance d are sufficiently small, the angles of incidence of the two waves, $\alpha$ and $\beta$, do not change between the points. The following two expressions, Eqs. 1 and 2, give the values of the received signal at points A and B:

$$r_1 = a_1 m_1(t) e^{j(\omega t+\varphi)} + b_1 m_2(t) e^{j(\omega t+\psi)} \quad \text{Eq. 1}$$

$$r_2 = a_2 m_1 e^{j\left(\omega t+\varphi-2\pi\frac{d}{2}sin\alpha\right)} + b_2 m_2 e^{j\left(\omega t+\psi-2\pi\frac{d}{2}sin\beta\right)} \quad \text{Eq. 2}$$

The values $m_1$ (l) and $m_2$(l) may be slowly changing modulation functions for the two waves, and $a_1$, $a_2$; $b_1$, $b_2$, may be scale factors for incident waves $W_1$ and $W_2$ at points A and B that account for propagation losses and fading, even though only a single wave from each direction is considered.

Since points A and B of FIG. 2 may correspond to exactly the same relative time positions in the two adjacent repetition periods of the part of the signal that is received by the correlator, the values of $a_1$ and $a_2$, would be the same if the propagation effects were not considered. The same remark applies to the values of $b_1$ and $b_2$, of course.

$W_1$ may be the stronger of the two waves so that it is required to attenuate it or cancel before $W_2$ becomes detectable. The following coefficient in Eq. 3 may be introduced:

$$k = \left(\frac{a_1}{a_2}\right) e^{2\pi j\left(\frac{\alpha}{\lambda}\right) sin\alpha} \quad \text{Eq. 3}$$

The two consecutive frames of the collected data may be combined using this coefficient as in Eq. 4.

$$\begin{aligned} r_1 - kr_2 &= b_1 m_2 e^{j(\omega t+\psi)} - b_2 m_2 \frac{a_1}{a_2} e^{\left[\omega t+\psi+2\pi\frac{d}{\lambda}(sin\alpha-sin\beta)\right]} \\ &= b_1 m_2 e^{j(\omega t+\psi)}\left[1 - \frac{b_2 a_1}{b_1 a_2} e^{2\pi j\frac{d}{\lambda}(sinc-sin\beta)}\right] \end{aligned} \quad \text{Eq. 4}$$

In Eq. 4, the component that represented $W_1$, with the modulation function $m_1$, cancelled. The remaining terms represent the second signal with its modulation function $m_2$. Under the assumption that there is no additional phase shift between point A and B in addition to the one accounted for by the different lengths of the propagation paths (as shown in FIG. 2), or in other words if all scale factors are real numbers, then depending on the relationship between the angles of arrival of the two waves, the result for the second signal may vary from 0 (both waves arrive from the same direction) to the maximum value of $$b_1 m_2\left(1 + \frac{b_2 a_1}{b_1 a_2}\right)$$

If signal levels are not changing significantly between points A and B, this maximum level may be about 6 dB higher than the true level of $W_2$ and may occur when the condition in Eq. 5 has been met.

$$sin\alpha - sin\beta = \frac{\lambda}{d}(2n-1), \text{ where } n \text{ is an integer.} \quad \text{Eq. 5}$$

Figure 3:
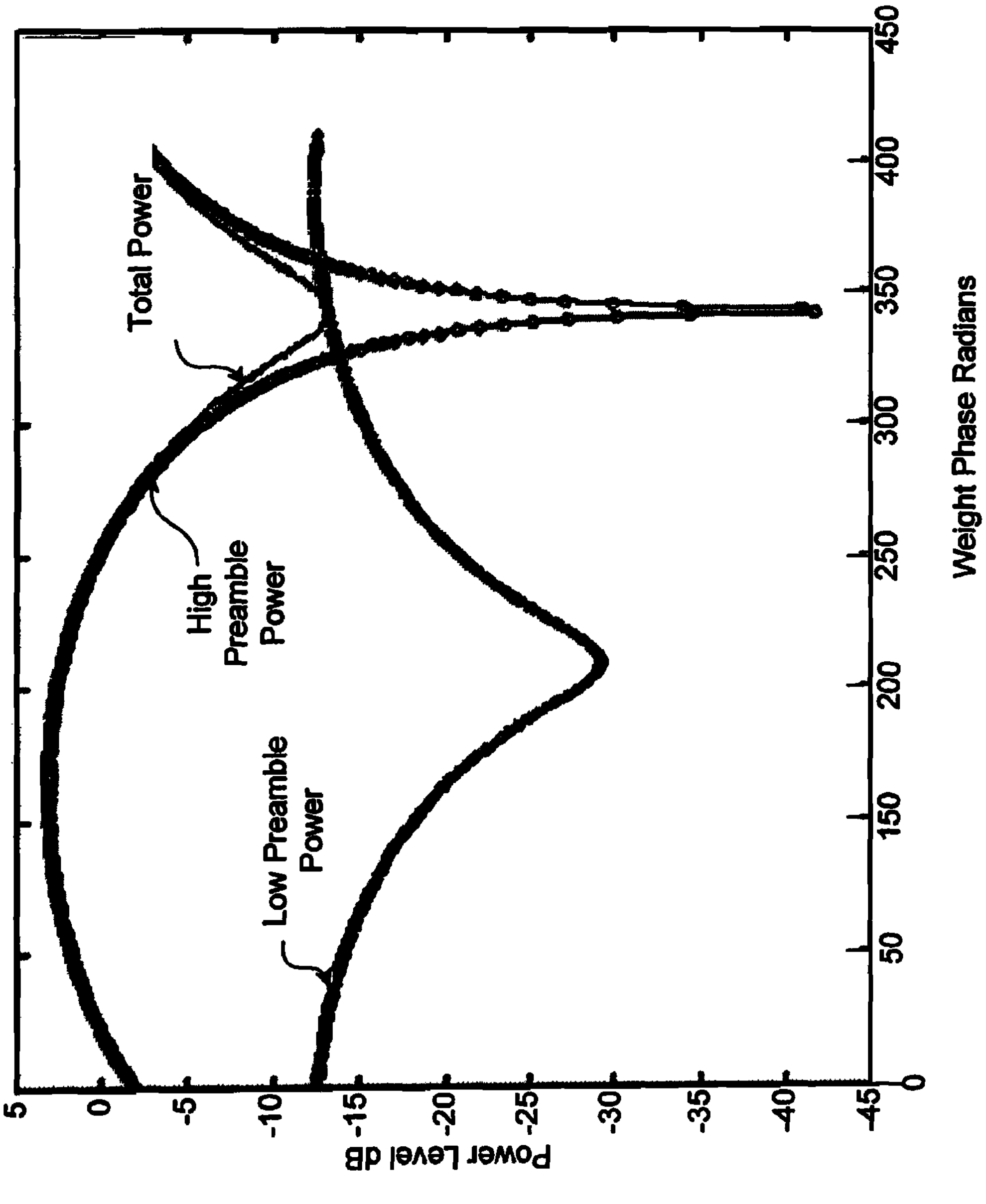
FIG. 3 is a graphic representation illustrating a computer simulation according to an embodiment.

FIG. 3 shows the result of a computer simulation of two flat waves modulated by WiMAX signals. In this case, the angles of arrival of the two waves are selected to maximize the effect of the method. The blue line represents the correlation with the preamble of the dominating signal versus the phase angle of the complex weight k, the amplitude having been selected in an iterative search to be optimal. The red line corresponds to the correlation result with the weaker of the two preambles. The green curve shows total received power. The cancellation effect is evident in FIG. 3.

This computer simulation may yield desired results only when the angles of arrival are substantially different. Ideally, the waves should be orthogonal. However, in a more realistic scenario the weaker signal will experience multipath propagation with a diverse range of angles of arrivals.

Figure 4:
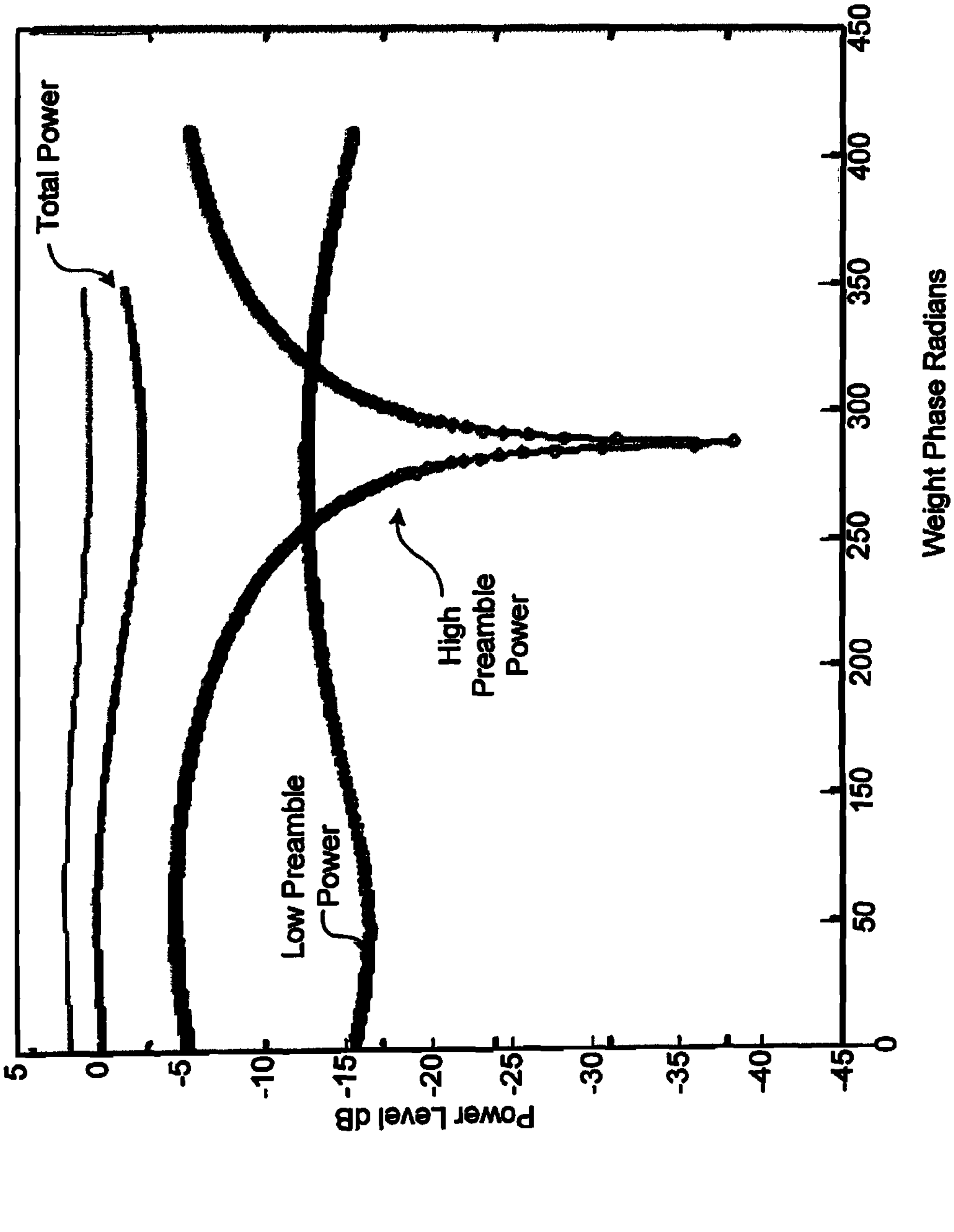
FIG. 4 is a graphic representation of processed signals according to an embodiment.

FIG. 4 illustrates the results of capturing and processing live WiMAX signals in accordance with embodiment methods. As in FIG. 3, the blue line in FIG. 4 illustrates the correlation with the preamble of the stronger signal while the red line represents the correlation with the preamble of the weaker signal. In this example, the preamble of the stronger signal is Preamble 1 and the preamble of the weaker signal is Preamble 28. These preamble numbers are assigned by the base stations in the area of the drive-test. Each preamble has a different structure depending on that number and as described in an IEEE standard (802.16-2005, in this case). However, this number is not meant to be limiting as other numbering conventions may be developed in the future and will be equally applicable to the embodiments illustrated herein.

Figure 5:
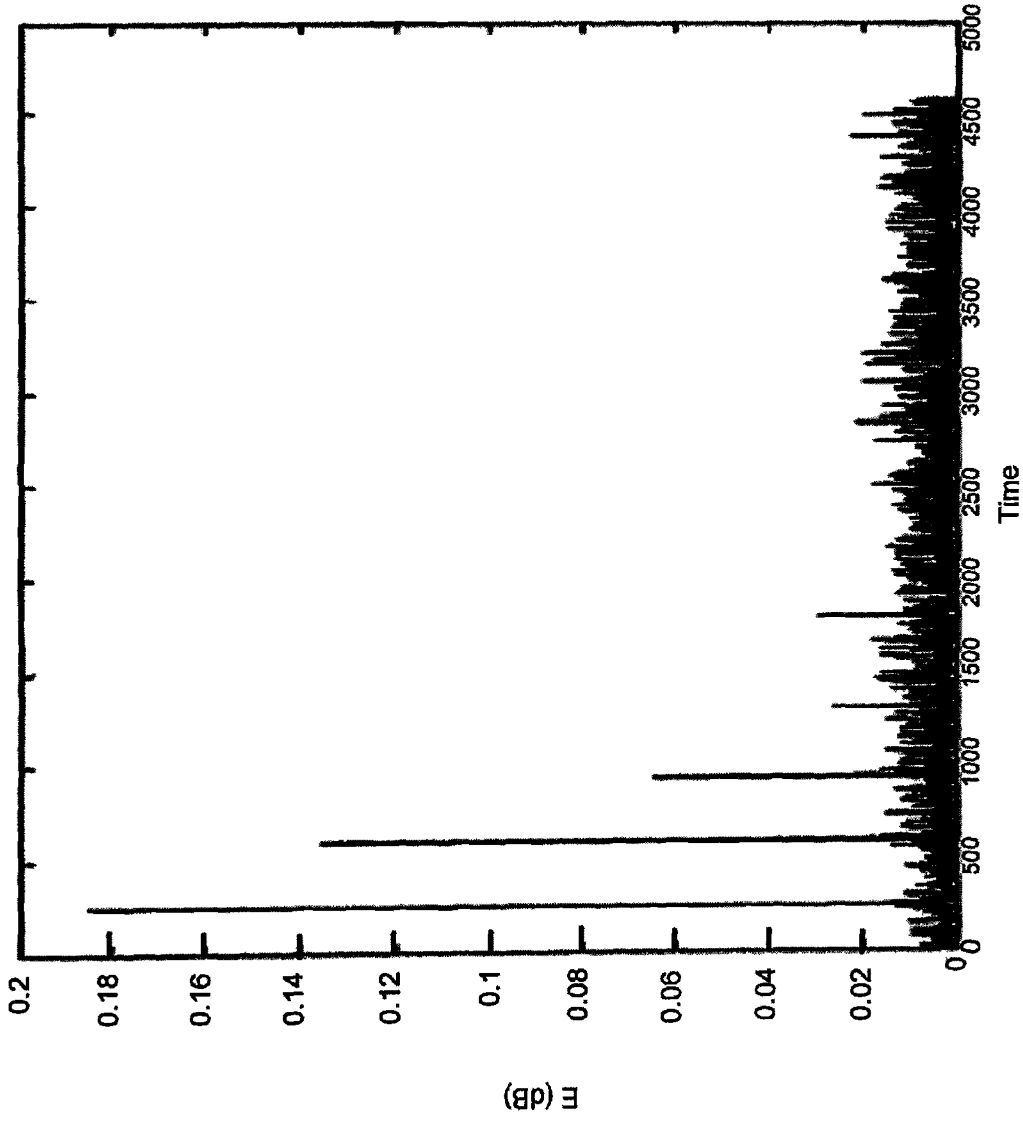
FIG. 5 is a graphic representation illustrating a detectable preamble in a signal sample.
Figure 6:
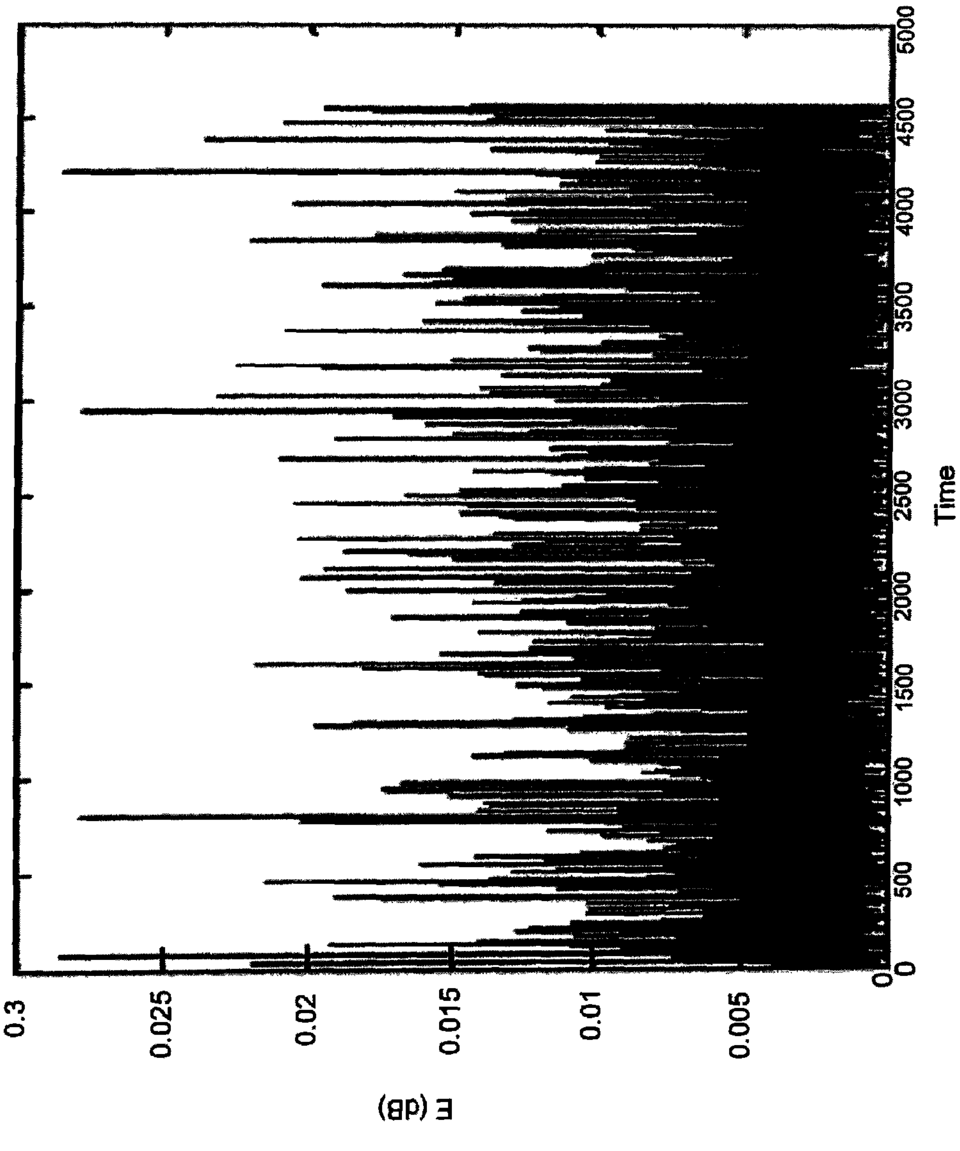
FIG. 6 is a graphic representation illustrating a signal sample in which the preamble is not detectable.

FIGS. 5 and 6 illustrate signal samples. FIG. 5 demonstrates that Preamble 1, the preamble of the stronger signal, could be detected, but FIG. 6 demonstrates that Preamble 28, the preamble of the weaker signal, could not.

Figure 7:
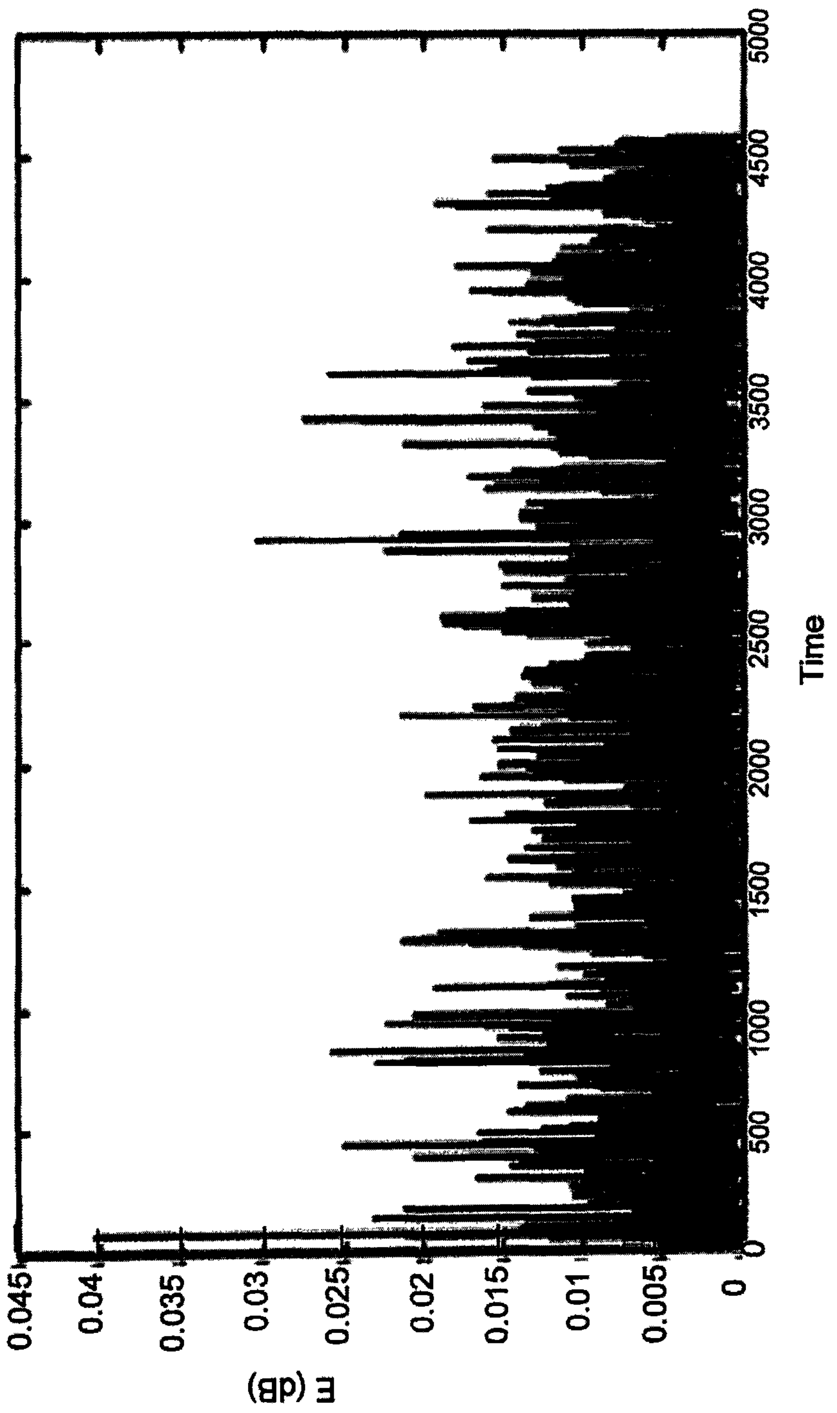
FIG. 7 is a graphic representation illustrating a signal sample in which the preamble is detectable according to an embodiment.

FIG. 7 illustrates the correlation results over time for Preamble 28 after applying an embodiment method. This FIG. 7 illustrates that there is one dominant correlation peak at the value of around 0.04. Before applying the algorithm of the embodiment, there were several noise-like peaks at lower levels that would not allow one to identify the signal unambiguously. These results demonstrate that Preamble 28 becomes reliably detectable.

Figure 8:
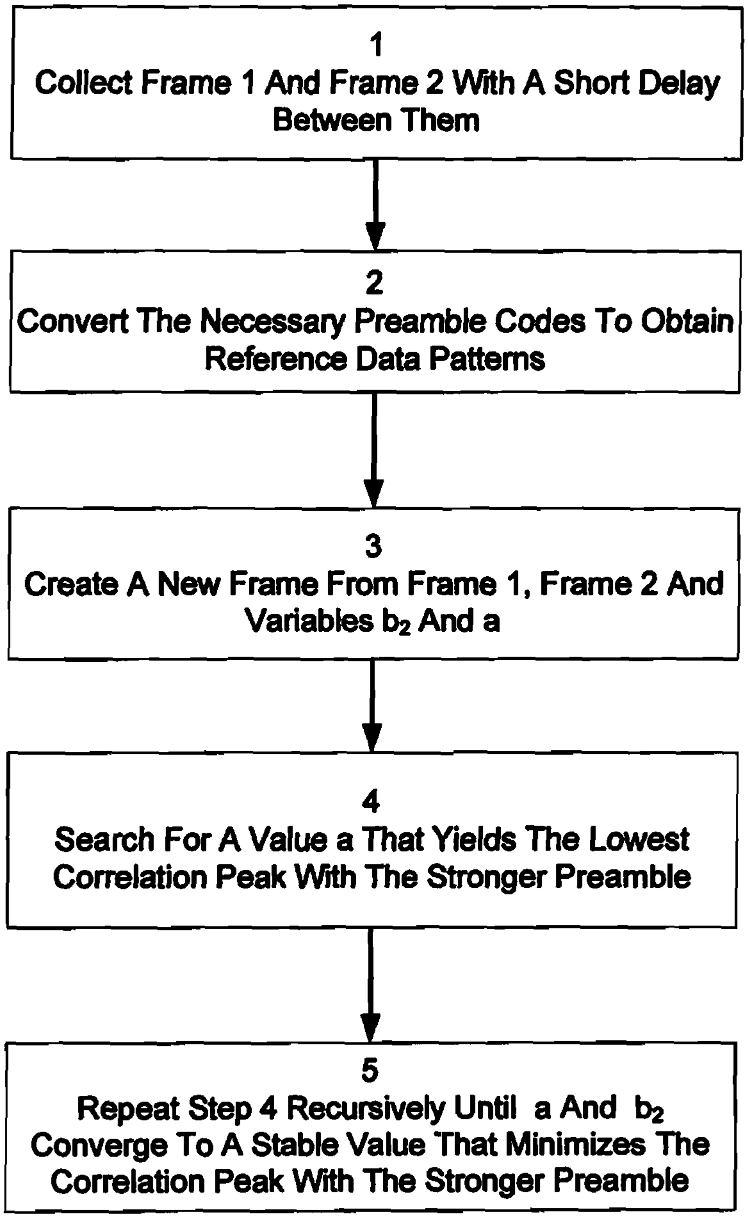
FIG. 8 is a flow diagram illustrating a process according to an embodiment.

FIG. 8 is a flow diagram illustrating a process according to an embodiment. As noted previously, the processes described herein may be implemented on a computing device as described below. In block 1, two frames with a short delay may be collected and called Frame 1 and Frame 2. These frames may be collected by an antenna on a moving platform, such as a vehicle driving. In block 2, preamble codes may be converted from hexadecimal format into binary (1,−1) in order to obtain reference data patterns. A new frame may be created in block 3 by combining Frames 1 and 2 according to the equation $Frame=Frame1+Frame2\cdot b_2 e^{j\cdot a}$ where $b_2$ and a are initially set to one and zero respectively. The value of a may be adjusted to search for a value that yields the lowest correlation peak power between the reference data patterns and the stronger preamble. The value of the angle a may be held constant while searching for a value of $b_2$ that yields the lowest correlation peak power. Block 5 may be repeating block 4 recursively until $b_2$ and a converge to a stable value that minimizes the correlation peak with the stronger preamble.

In an embodiment, the methods and systems described herein may be used to detect otherwise undetectable weak signals. Once a signal is detected, it is possible to estimate such signal parameters as time of arrival, frequency offset, etc. This narrows the signal space to be searched for signals so that a better matched filter may be used, thus lowering the noise power. This, in turn, widens the dynamic range of accurate measurement of the signal level. In this way, embodiments may perform signal level measurements with a single antenna when the signal was previously undetectable.

When a signal experiences strong, fast fading, the signal's level may be measured by averaging multiple results of the enablement methods provided that the average magnitude of the scaling factors is known. If both of the signals, i.e., the stronger to be cancelled, and the weaker to be enhanced, are subject to strong fading, the additional processing, as described above, causes the signal to fluctuate even more, since combining two frames is equivalent to introducing more multipath components. If the average value of the scaling coefficient $b_2$ is maintained at close to unity (by not using second frames where the stronger signal fades too low in reference with the average value), then the average of multiple results for the weaker signal should be close to double the true average power of this signal.

The described method may be extended to cancelling multiple signals to recover a second, third, or other weaker signals. It will require more frames to be combined in order to be able to cancel multiple signals. For example, in order to cancel two stronger signals and recover the third one, one would need first to use two pairs of frames to obtain two linearly independent combination frames where the first stronger signal is not present or has been cancelled. Then, by proceeding in the embodiment methods described above, one is able to cancel the second stronger signal, leaving the third signal detectable. The specific algorithms for combining frames may differ.

Embodiments may be beneficially applied to the problem of the measurement of the spatial-temporal response of the vector channels that exist between multi-antenna arrays in MIMO systems. In some embodiments, switching between antennae is replaced by the movement of the antenna in such a way that the same antenna receives the signals that are transmitted repeatedly, at different, but controlled antenna locations. However, not just a linear antenna array oriented along the axis of the vehicle can be emulated in this way. Any two-dimensional antenna array, such as a uniform circular array, may be emulated if the system includes enough antennae and a means for using them, such as a multi-channel receiver or a single-channel receiver with an antenna switch.

Embodiments may be used for the purpose of MIMO channel estimation. It is important to effect all the necessary antenna movements and switching in less than the time coherence interval for the channel. Since the coherence interval depends on the maximum Doppler shift of the channel, it is apparent that the ability to use certain embodiments is not affected by the varying speed of the platform. At low speeds it takes longer to shift the antenna position to the next position of capture, but the coherence time increases proportionally as well, so the coherence condition will not be violated (ignoring the relatively minor effects of Doppler shifts caused by surrounding moving objects).

In certain cases it will be possible to estimate the number of multipath components in the signal by using the charts similar to those in FIG. 4. For the signal to be enhanced, the amount of variance when the scaling factor rotates will indicate the presence or absence of LOS components or, in general, the presence of dominating discrete components.

Figure 9:
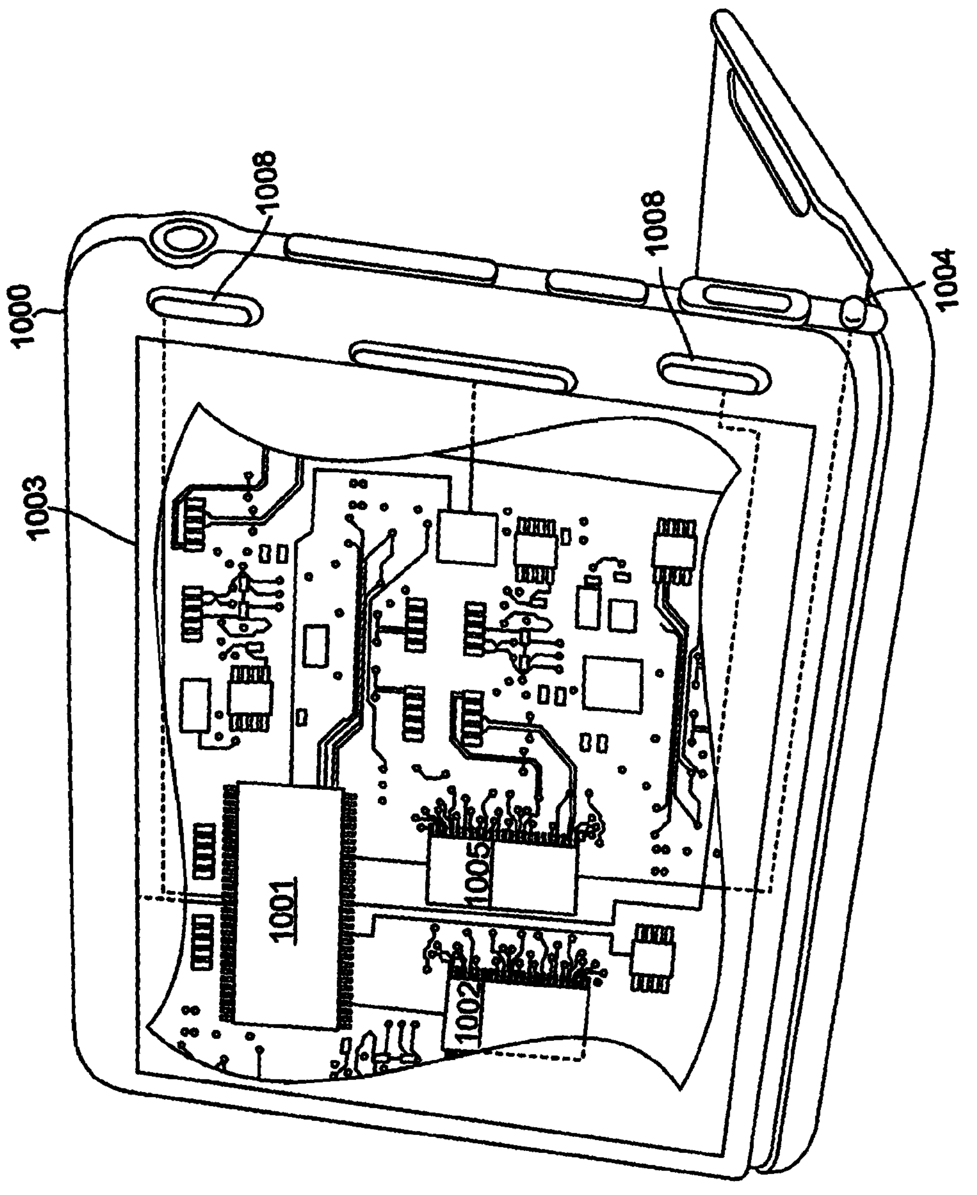
FIG. 9 is a block diagram of a computing device suitable for use with any of the embodiments.

FIG. 9 is a block diagram of a computing device suitable for use with any of the embodiments. A typical computing device 1000 may include a processor 1001 coupled to internal memory 1002, to a display 1003, and to a speaker 1008. Additionally, the computing device 1000 will include an antenna 1004 for sending and receiving electromagnetic radiation and/or data messages to and from the Internet and/or other networks. The processor 1001 may be any programmable microprocessor, microcomputer or multiple processor chip or chips that can be configured by software instructions (applications) to perform a variety of functions, including the functions of the various embodiments described below. In some receiver devices, multiple processors may be provided. Typically, software applications may be stored in the internal memory 1002 before they are accessed and loaded into the processor 1001. The processor 1001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for detection of a signal of interest in signal samples collected by a single antenna mounted on a moving platform, wherein the signal samples comprise signals having fixed patterns that are repeated over a fixed repetition rate $F_{fr}$, the method comprising:

collecting by the single antenna a first signal sample from the moving platform at time $T_1$, wherein the platform moves at a rate of V meters per second;

collecting by the single antenna a second signal sample from the moving platform at time $T_2$, wherein $T_2-T_1=1/F_{fr}$;

treating the first signal sample as received by a first antenna mounted on the moving platform and treating the second signal sample as received by a second antenna mounted on the moving platform, wherein the first and second antennas are separated by a distance of $V/(1/F_{fr})$; and processing by a receiver the first and second signal samples to detect the signal of interest.

2. The method of claim 1, wherein the signal sample comprises a first signal and a second signal, wherein the second signal is weaker than the first signal, and wherein the second signal is the signal of interest.

3. The method of claim 2, wherein processing by a receiver the first and second signal samples to detect the signal of interest comprises processing the first and second signal samples to minimize the first signal.

4. The method of claim 1, wherein the signal samples comprise MIMO signals.

5. The method of claim 1, wherein the sample signals are selected from the group consisting of WiMAX signals and LTE signals.

6. The method of claim 1, wherein the moving platform is a motor vehicle performing a drive-test.

7. A system for detection of a signal of interest in signal samples comprising:

a moving platform;

a single antenna mounted on the moving platform; and a receiver, wherein the single antenna is configured to:

collect a first signal sample from the moving platform at time $T_1$, wherein the platform moves at a rate of V meters per second; and collect a second signal sample from the moving platform at time $T_2$, wherein $T_2-T_1=1/F_{fr}$, wherein the first and second signal samples comprise signals having fixed patterns that are repeated over a fixed repetition rate $F_{fr}$, and wherein the receiver is configured to:

treat the first signal sample as received by a first antenna mounted on the moving platform and treating the second signal sample as received by a second antenna mounted on the moving platform, wherein the first and second antennas are separated by a distance of $V/(1/F_{fr})$; and process the first and second signal samples to detect the signal of interest.

8. The system of claim 7, wherein the signal sample comprises a first signal and a second signal, wherein the second signal is weaker than the first signal, and wherein the second signal is the signal of interest.

9. The system of claim 8, wherein configuring the receiver to process the first and second signal samples to detect the signal of interest comprises configuring the receiver to process the first and second signal samples to minimize the first signal.

10. The system of claim 7, wherein the signal samples comprise MIMO signals.

11. The system of claim 7, wherein the sample signals are selected from the group consisting of WiMAX signals and LTE signals.

12. The system of claim 7, wherein the moving platform is a motor vehicle performing a drive-test.

* * * * *